United States Patent Office 3,636,101
Patented Jan. 18, 1972

3,636,101
PROCESS FOR THE PRODUCTION OF
DICARBOXYLIC ACIDS
Thomas F. Doumani, deceased, late of Fullerton, Calif.,
by Selma S. Doumani, executrix, Fullerton, Calif.,
assignor to Union Oil Company of California, Los
Angeles, Calif.
No Drawing. Filed Oct. 24, 1969, Ser. No. 870,015
Int. Cl. C07c 51/24
U.S. Cl. 260—537 P
7 Claims

ABSTRACT OF THE DISCLOSURE

A cycloparaffin is converted to an aliphatic dicarboxylic acid by nitrating the cycloparaffin, contacting the resulting nitrocycloparaffin with an alkali or alkaline earth hydroxide or with ammonia to form a metal or ammonium salt thereof, and oxidizing the salt with nitric acid to form the dicarboxylic acid. A preferred method is nitrating cyclohexane, forming an ammonium salt of the nitrocyclohexane and oxidizing the salt with nitric acid in the presence of molecular oxygen to form adipic acid, useful in the manufacture of nylon.

DESCRIPTION OF THE INVENTION

This invention relates to a process for the production of aliphatic dicarboxylic acids. More particularly, the invention relates to an improved method wherein nitrocycloparaffin salts are oxidized with nitric acid to aliphatic dicarboxylic acids. The invention has particular utilization in the manufacture of adipic acid from cyclohexane.

Adipic acid is commonly produced by oxidizing cyclohexane to a mixture comprising cyclohexanol and cyclohexanone and oxidizing the mixture with nitric acid to form adipic acid. See U.S. Pats. 2,557,282, 2,703,331, 2,844,626 and 3,035,092. A problem encountered in the foregoing processes is that other oxidation products are produced such as cyclohexyl formate, cyclohexyl valerate, 1,2-cyclohexanediol, valeric acid, etc. These compounds are harmful in that they are or promote production of undesirable by-products in the nitric acid oxidation step which are difficut to separate and necessitate complicated recovery methods as evidenced by the processes disclosed in U.S. Pats. 2,804,475, 3,023,238, 3,338,959 and 3,390,174.

An object of the invention is to provide a method for the manufacture of aliphatic dicarboxylic acids, particularly adipic acid.

Another object of the invention is to improve the process of producing dicarboxylic acids from cycloparaffins whereby the amounts of oxidation by-products are minimized so as to simplify recovery methods.

Other and related objects will be apparent from the following description.

According to the invention, a cycloparaffin is reacted with nitric acid or another nitrating agent to form a nitrocycloparaffin. The nitrocycloparaffin is contacted with an inorganic hydroxide or with ammonia to form a salt of the nitrocycloparaffin which is then oxidized by nitric acid to form an aliphatic dicarboxylic acid. The process of the invention differs principally from prior art processes in that a salt of a nitrocycloparaffin, rather than an alcohol or ketone of a cycloparaffin, is oxidized by nitric acid to form the dicarboxylic acid. Hence, the essence of the invention is reacting a metal or ammonium salt of a nitrocycloparaffin with nitric acid to form an aliphatic dicarboxylic acid.

The cycloparaffin which can be reacted to form the aforementioned nitrocycloparaffin salt can have from 4 to about 8 cyclic carbons and up to three alkyl groups bonded to one or more of the cyclic carbons. The alkyl groups may have 1 to about 4 carbons. The cycloparaffin preferably has 5 to 7 cyclic carbons and contains no alkyl sidegroups.

Examples of suitable cycloparaffins include cyclobutane, cyclopentane, cyclohexane, cycloheptane, cyclooctane, methylcyclopentane, ethylcyclohexane, isopropyl cycloheptane, butyl cyclooctane, methylcyclohexane, butylcyclohexane, 1,3-dibutylcycloheptane, and 1,2-dipropylcyclooctane, etc. The number of carbon atoms of the desired dicarboxylic acid corresponds to the number of carbon atoms of the cycloparaffin and the proper cycloparaffin can be easily determined for the particular dicarboxylic acid desired by comparing the structure and number of carbon atoms of the acid with that of the cycloparaffin. For example, succinic acid, glutaric acid, adipic acid, pimelic acid and suberic acid may be produced from cyclobutane, cyclopentane, cyclohexane, cycloheptane and cyclooctane, respectively.

The cycloparaffin may be nitrated by contact with nitric acid, nitrogen dioxide, nitrogen tetroxide or any other nitrating agent under liquid phase conditions at a temperature from 50°–500° C., preferably 100°–300° C. and at pressures of 1–20 atmospheres, preferably 3–10 atmospheres sufficient to maintain liquid phase. The molar amount of cycloparaffin is preferably 3:1–15:1, most preferably 5:1–15:1 times that of the nitrating agent. The concentration of the preferred nitrating agent, nitric acid, in aqueous solution, may be 20–90 weight percent, preferably 40–70 weight percent.

The nitrocycloparaffin is then contacted with an inorganic metal hydroxide, ammonium hydroxide, or ammonia to form the nitrocycloparaffin salt. The preferred hydroxides are those of the alkali or alkaline earth metals or the Group 1b and 2b metals, e.g., sodium, potassium, lithium, magnesium, calcium, barium, copper, silver, zinc, cadmium, etc. The alkali or alkaline earth metal hydroxides, e.g. sodium hydroxides, potassium hydroxide, magnesium hydroxide, etc., are generally preferred, due principally to their ready availability. The metal salts may be conveniently introduced into the reaction medium as aqueous solutions having solute concentrations from 10 to 90 weight percent. It is preferred that the metal salts be provided in a stoichiometric excess of the nitrocycloparaffin, e.g., in a molar amount from 1.5 to 10, preferably from 3 to 10, times the molar amount of the nitrocycloparaffin.

In another embodiment, ammonia can be contacted with the nitrocycloparaffin to form an ammonium salt of the nitrocycloparaffin. It is preferred that the ammonia be provided as anhydrous liquid ammonia, e.g., containing less than about 10 weight percent and, preferably, less than 5 weight percent water. It is also preferred to provide excess quantities of ammonia. Use of ammonia is generally preferred to use of a metal salt, in that the ammonium ion, when contacted with nitric acid in the oxidation step, is converted to ammonium nitrate, a valuable fertilizer.

The aforementioned salt-forming process may be conducted at moderate temperatures, e.g., 30°–300° C., preferably 30°–200° C., and pressures, e.g., 1–20 atmospheres, preferably 1–5 atmospheres, sufficient to maintain liquid phase. The process may be conducted either in the presence or absence of catalysts. Other techniques known in the art may be utilized to form the nitrocycloparaffin salt wherein the nitrocycloparaffin (absent one hydrogen) is an anion in association with a cation, e.g. sodium or ammonium.

The nitrocycloparaffin salt may be separated from unreacted cycloparaffin, nitrocycloparaffin and by-products, if any, of the above described processes, and introduced into a vessel where it is contacted with nitric acid to form the aliphatic dicarboxylic acid product. This may be performed at mild temperatures, e.g., 50°–300° C., preferably 70°–200° C. and pressures, e.g., 1–20 atmospheres, preferably 5–15 atmospheres and sufficient to maintain liquid phase reaction conditions. The nitric acid oxidation may be performed in the absence of a catalyst or in the presence of catalysts such as compounds of vanadium, manganese, copper, cobalt, molybdenum, nickel, lead, chromium, iron or mercury. The preferred compounds of these catalytic metals are the oxides, nitrates or acetates and a most preferred catalyst is vanadium pentoxide. The nitric acid utilized may be an aqueous solution of 20–90 weight percent, preferably 40–70 weight percent, nitric acid and it is preferably that the nitric acid be provided in excess quantities, e.g., the mole ratio of nitric acid to the nitrocycloparaffin salt be 3:1–15:1, preferably 5:1–15:1. The nitric acid is reduced to nitrogen oxide vapors such as nitrous oxide, nitrogen dioxide and nitric oxide which may be oxidized in situ by oxygen to nitrogen dioxide. The reoxidized nitrogen dioxide may be removed overhead and transferred to a regeneration unit to contact water to form nitric acid which may be recycled to the above-described oxidation zone. In another embodiment, the reduced nitrogen oxides may be removed and separately regenerated by contact with oxygen and water.

A reaction medium comprising the dicarboxylic acid product, ammonium nitrate or unreacted nitric acid and by-products are withdrawn from the nitric acid oxidizer and the desired dicarboxylic acid separated therefrom. The withdrawn liquid phase may be subjected to distillation and/or extraction to separate nitric acid, ammonium nitrate or sodium nitrate, etc., nitrocycloparaffin salt, etc. and by-products, if any, from the dicarboxylic acid. The dicarboxylic acid fraction may be further purified by known crystallization and filtration techniques. Multiple crystallization and filtration stages may be employed to further purify the desired acid with the number of crystallization and filtration stages depending on the purity desired.

The by-product nitrate salt, e.g., ammonium or sodium nitrate, may be either sent to product storage or to a regeneration unit where it can be contacted with acid to regenerate nitric acid for reuse in the aforementioned processes. Any separated nitric acid, nitrocycloparaffin, cycloparaffin or nitrocycloparaffin salt may be recycled to the appropriate process stage as described hereinabove.

The invention will now be illustrated and the results obtained thereby demonstrated by the following examples:

EXAMPLE 1

To a flask were added 10 grams of nitrocyclohexane and a solution containing 5.2 grams of 97 weight percent sodium hydroxide. The mixture was heated to about 90° C. and continuously stirred. The oil phase disappeared leaving a clear solution of sodium nitrocyclohexane. The aqueous sodium nitrocyclohexane salt solution was added gradually to a flask containing 50 milliliters of boiling 70 percent nitric acid. Evolution of nitrogen oxides was observed upon addition of the sodium salt. The mixture was diluted with about 80 milliliters of water and the aqueous phase was separated from trace amounts of organic by-product and from about one milliliter of unreacted nitrocyclohexane. The diluted mixture was evaporated on a steam bath to remove water and excess nitric acid. The residue was cooled to about 0° C. and filtered to recover adipic acid.

EXAMPLE 2

To a Dewar flask was added 80 milliliters of liquid ammonia chilled to about −52° F. The flask was stirred continuously while 40 milliliters of nitrocyclohexane was gradually added. It was observed that ammonium nitrocyclohexane was formed.

To a 500 milliliter distillation flask was added 50 milliliters of concentrated 70 percent nitric acid. The flask was stirred and heated to and maintained at 120° C. while about 4 grams of the ammonium nitrocyclohexane salt was slowly added over a period of about 30 minutes. Evolution of nitrogen oxide vapors was observed. The flask was placed on a steam bath for approximately 1 hour to evaporate nitric acid from the residue. The residue was cooled to ambient temperatures, water washed, filtered and the crystals obtained therefrom were airdried. The dried crystals were observed to be adipic acid.

The preceding examples are intended solely to illustrate the invention and results obtainable thereby. It is apparent that similar results can be achieved by substitution of any of the aforementioned equivalent reagents, e.g., by substitution of methylcyclooctane for cyclohexane to produce methyloctadionic acid.

What is claimed is:

1. A process for formation of an aliphatic dicarboxylic acid comprising contacting a metal or ammonium salt of a nitrocycloparaffin having 4 to 8 cyclic carbons and no more than three $C_1$–$C_4$ alkyl groups, said metal being an alkali or alkaline earth metal, or a Group 1b or 2b metal, with nitric acid under liquid phase reaction conditions at a temperature between 50° C. and 300° C. and at a pressure between 1 atmosphere and 20 atmospheres sufficient to form an aliphatic dicarboxylic acid having the same number of carbon atoms as said nitrocycloparaffin salt.

2. The method of claim 1 wherein said nitrocycloparaffin salt is an ammonium or alkali or alkaline earth metal salt of a nitrocycloparaffin having 5–7 carbons.

3. The method of claim 2 wherein the said nitroparaffin is cyclohexane.

4. The method of claim 2 wherein said nitroparaffin is derived by nitrating cyclobutane, cyclopentane, cycloheptane or cyclooctane.

5. The method of claim 1 wherein said salt is formed by nitrating a cycloparaffin and contacting the nitrocycloparaffin with anhydrous liquid ammonia.

6. The method of claim 1 wherein said salt is formed by nitrating a cycloparaffin and contacting the nitrocycloparaffin with an alkali or alkaline earth hydroxide.

7. The method of claim 5 wherein said alkali metal is sodium.

References Cited

UNITED STATES PATENTS

| | | | |
|---|---|---|---|
| 2,789,136 | 4/1957 | O'Hara | 260—537 |
| 2,196,357 | 4/1940 | Knowlton et al. | 260—537 |
| 2,420,938 | 5/1947 | Doumani et al. | 260—537 |
| 3,255,261 | 6/1966 | Mello et al. | 260—537 |

LORRAINE. A. WEINBERGER, Primary Examiner

V. GARNER, Assistant Examiner

U.S. Cl. X.R.

260—429.9, 430, 431, 438.1, 644